United States Patent [19]
Woodward

[11] 4,190,821
[45] Feb. 26, 1980

[54] SELF-HEALING LOOP COMMUNICATIONS SYSTEM

[75] Inventor: Thomas R. Woodward, West Chester, Pa.

[73] Assignee: Burroughs Corporation, Detroit, Mich.

[21] Appl. No.: 947,854

[22] Filed: Oct. 2, 1978

[51] Int. Cl.² .......................... H04Q 9/00; H04J 3/14
[52] U.S. Cl. ........................ 340/147 SC; 179/15 AL
[58] Field of Search .................... 340/147 R, 147 SC; 179/15 AL

[56] References Cited
U.S. PATENT DOCUMENTS

| Re. 28,958 | 9/1976 | Zafiropulo et al. | 340/147 SC |
| 3,652,798 | 3/1972 | McHeilly et al. | 179/15 AL |
| 4,007,441 | 2/1977 | Faber | 340/147 R |

OTHER PUBLICATIONS

G. J. Laurer et al., "Automatic Loop Reconfigurator", IBM Technical Disclosure Bulletin, vol. 19, No. 10, Mar. 1977, p. 3824.
P. Zafiropulo, "Performance Evaluation of Reliability Improvement Techniques for Single-Loop Communications", IEEE Transactions on Communications", vol. COM-22, No. 6, Jun. 1974, p. 742.
E. Hafner et al., "Enhancing the Availability of a Loop System by Meshing", 1976, International Zurich Seminar.

*Primary Examiner*—Donald J. Yusko
*Attorney, Agent, or Firm*—Mark T. Starr

[57] ABSTRACT

Primary and back-up closed loop unidirectional transmission lines transmit self-clocking data streams and null data, respectively, in opposite directions to a plurality of loop interface units (LIUs) connected to the primary and back-up lines. To protect against failure of the entire system due to a break in the primary and/or back-up lines or failure of one of the loop interface units, each loop interface unit can detect a signal loss on the primary or back-up transmission line and wrap signal flow to bypass the detected fault. After wrapping around a detected fault, an LIU then creates a failure on the non-failing line causing an analogous wraparound in the LIU on the other side of the actual failure. After error recovery, there is then a complete loop connecting all non-failing loop interface units, although it is twice as long as before the signal loss was detected. Also disclosed is an alternate embodiment in which a microprocessor and attached external device are interconnected to a similar loop structure.

24 Claims, 11 Drawing Figures

SELF-HEALING LOOP COMMUNICATIONS SYSTEM

BACKGROUND OF THE INVENTION

Serial data transmission loops have found increasing usage in recent years particularly in the area of terminal-attachment. The major drawbacks of loop communications networks are that they are unreliable and relatively vulnerable. A single loop represents an extreme series configuration. Thus, if a single element fails or if one or more breaks occur in the serial single loop network, the entire network will be disabled. Similarly, when it is desired to add an element to the single series loop, the entire loop network is disabled until the new element is connected. The unreliability of the loop increases drastically as the number of elements on the loop increases.

Modifications to the single loop configuration, with the aim of increasing reliability, are well known in the prior art. Thus, in P. Zafiropulo, "Performance Evaluation of Reliability Improvement Techniques for Single-Loop Communications Systems", IEEE Transactions on Communications, VOL. COM-22, No. 6, June, 1974, p. 742, the author points out three loop-reliability (availability) improvement techniques, all of which are based on using an auxiliary transmission path parallel to the main loop. In the first so-called bypass technique, both main and standby loops transmit in the same direction. When a catastrophic failure occurs, the signal stream is routed onto the standby loop. The second method is the self-heal technique. Here, main and standby loops transmit in opposite directions. When a catastrophic failure occurs, the signal stream is rerouted such that the resulting configuration consists of a loop which bends back on itself at either side of the failure. The combined technique is the third method and consists of ORing the bypass and self-healing techniques, i.e., either the bypass or self-healing action can occur but not simultaneously.

Other methods of increasing the reliability of closed loop communications systems have been proposed. Thus, in E. Hafner et al., "Enhancing the Availability of a Loop System by Meshing", a paper presented at the 1976 International Zurich Seminar, a configuration called a braid was proposed. In such a configuration, an outer circular path serves as the main path containing the terminal access points and inner paths serve as bypasses that can be used for bridging the main path between two switches configured on the outer circular path.

Another method of increasing loop reliability was disclosed by G. J. Laurer et al. in "Automatic Loop Reconfigurator", IBM Technical Disclosure Bulletin, VOL. 19, No. 10, March 1977, page 3824. In such a configuration, a controller in the loop is provided with a mechanism for detecting a break or failure of a component in the loop. When this condition is detected, the controller divides the network into two subsystems and initiates a number of steps which result in the creation of two half duplex subsystems, each of which originates at the controller and terminates at one of the two ends created by the break or failure in the loop.

One implementation of the self-healing technique discussed by Zafiropulo, op. cit., is that disclosed in U.S. Pat. No. 3,652,798, issued to Joseph Hood McNeilly et al. on Mar. 28, 1972. In the McNeilly system, a timing station provides time division multiplex channel signals on a first closed loop unidirectional transmission line interconnective in tandem subscriber stations, each of which may gain access to an unused channel signal for communication with an idle subscriber station. To protect against failure of the entire system due to a break in the line or failure in one of the subscriber stations, a second closed loop unidirectional transmission line is connected to all stations transmitting signals in a direction opposite to that on the first line. Each subscriber station can detect an error and transfer the communications signals on the first line to the second line. The subscriber station before the break transfers the communication signal to the second line and the subscriber station after the break transfers the communication signals back to the first line to form a new, but continuous closed loop. When communication signals are on the second line and a fault occurs, the transfer of communications signals will be similarly performed to provide still another new, but continuous closed loop bypassing the fault.

In the McNeilly system, when a first subscriber station next to a fault detects the absence of signals on the first (primary) line input, it simultaneously wraps its secondary output to its primary input and breaks its output connection to the secondary line to isolate the subscriber station from the primary and secondary lines on the fault side of the subscriber station. At the same time it sends an alarm signal out over the primary line to the next subscriber station. The next subscriber station detects initially the absence of signal on the primary line and operates to break the two lines and connect its secondary output to its primary input as in the case of the first subscriber station. However, the next subscriber station is still able to receive the alarm signals from the first subscriber station and when this is received the secondary output to primary input connection is broken and the next subscriber station reverts to normal operation. This procedure is repeated until the alarm signal reaches the (last) subscriber station on the other side of the fault (which had initiated error recovery when the first subscriber station broke its secondary output, thus causing a loss of signal at the secondary input to the last subscriber station), where it is transferred to the secondary line and so eventually reaches the timing station for the second time, having once passed through the timing station on the primary line. The timing station then removes from its outgoing secondary line the unique standby signal and connects the outgoing line directly to a bypass connection in the timing station. The timing station therefore includes a standby signal generator, a primary line signal detector and a bypass switch. Thus, after a brief pause, all subscriber stations are again connected by a new unbroken closed loop composed of the primary and secondary lines on both sides of the fault and loop backs implemented by each subscriber station adjacent to the fault.

The McNeilly system has several inherent drawbacks. First, the system utilizes an alarm signal to reset subscriber stations which incorrectly initiate error recovery when a fault occurs. Thus, each subscriber station must include detection circuitry to differentiate between the receipt of normal signals and an alarm signal. Second, the system requires timing station circuitry to detect the loss of the standby signal and in response disconnect the secondary line signal generator. The timing station must therefore be able to distinguish between the primary and secondary line signals on the secondary input to the timing station. A third drawback of the system is that upon detection of a loss of primary input signal at a subscriber station, the subscriber station breaks its secondary line output simultaneously with wrapping its secondary output to its primary input. Thus, a secondary line fault is created before it is determined whether the primary signal loss is due to an actual break in the primary line adjacent to the subscriber station or a break in the primary line adjacent to some other subscriber station. Thus, incorrect error recovery due to the created secondary line fault is initiated. This will cause an increase in the time required for the system to recover from the actual break in the primary line as subscriber station will have to be reset a second time.

It is a general object of the present invention to eliminate these and other drawbacks of the prior art by providing an improved self-healing loop communications network.

It is another object of the present invention to provide a self-healing loop communications network which does not require a central control for accomplishing error recovery.

It is still another object of the present invention to provide a self-healing loop communications network wherein all recovery actions are accomplished under strictly local control.

It is a further object of the present invention to provide a self-healing loop communications network wherein subscriber stations directly involved in detecting a loop failure require no direction from other subscriber stations to complete the error recovery process.

These and other objects, features and advantages of the present invention will become more apparent from the detailed description of the preferred embodiment when read in conjunction with the drawings.

SUMMARY OF THE INVENTION

According to the invention, the communications system includes primary and back-up closed loop unidirectional transmission lines for transmitting signals in first and second opposite directions, respectively. A serial data stream in a self-clocking code is transmitted in the first direction on the primary line while self-clocking idle data circulates around the back-up loop in the second direction.

In the preferred embodiment a plurality of loop interface units (LIUs) are coupled to the primary and back-up lines. Each LIU includes means to detect a first signal loss on the primary line and, after waiting sufficient time to assure that the error is solid, to wrap its back-up output to its primary input, thus providing a first wraparound to bypass the first fault. The latter action restores signals to the primary inputs of LIUs down line in the first direction and thus cancels their analogous error recovery. After waiting sufficient time for resetting all downline LIUs incorrectly engaged in error recovery, the LIU adjacent to the primary signal loss in the first direction breaks its output connection to the back-up line, thus creating a signal loss on the back-up line. Each LIU further includes means to detect and recover from a loss of signal at their back-up inputs. Thus, error recovery analogous to that for a signal loss on the primary line occurs for the first LIU adjacent to the created break in the second direction. This results in the latter mentioned LIU's primary output being wrapped to its back-up input, thus creating a second wraparound to bypass the created fault. At this point, there is again a complete loop connecting all LIUs, although it is now twice as long as before the signal loss on the primary line.

The system can recover from a break in the primary and/or back-up lines between LIUs or from the total failure of an LIU.

An alternate embodiment provides a communications system for interconnecting external devices in a loop structure. Thus, a plurality of nodes, each including an LIU, are connected to the primary and back-up lines. Each node includes a microprocessor (and attached memory) coupled to the LIU for processing data. An interface unit attaches one or more external devices to the microprocessor. The node provides for transferring data between the external device(s) and the communications loop. The LIU included in each node provides error recovery capabilities similar to those in the previously described embodiment.

DESCRIPTION OF THE PREFERRED EMBODIMENT

A communications loop (or ring) is a closed, ring-connected set of nodes providing data flow unidirectionally from one node to the next. Typically, each link between nodes is a single twisted pair of wires carrying a serial data stream in a self-clocking code. Full connectivity is achieved by associating a destination address with each packet of data carried on the loop. A node to whom a packet of data is not addressed acts simply as a delayed repeater, having no effect on that data other than introducing some delay. The concept of a data exchange loop is well known to those skilled in the art. Loops may be distributed such that each node contains its own power supply and cabinet and is located near the equipment it interfaces or local such that all nodes are connected within a single cabinet with cable connections to interfaced equipment.

Figure 1:
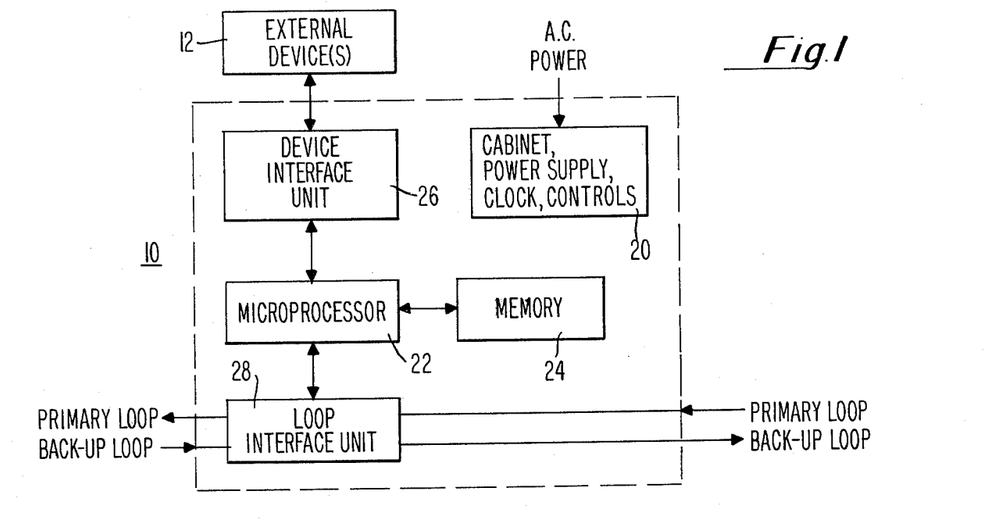
FIG. 1 is a functional block diagram of a communication loop node such as that utilized in the present invention.
Figure 2:
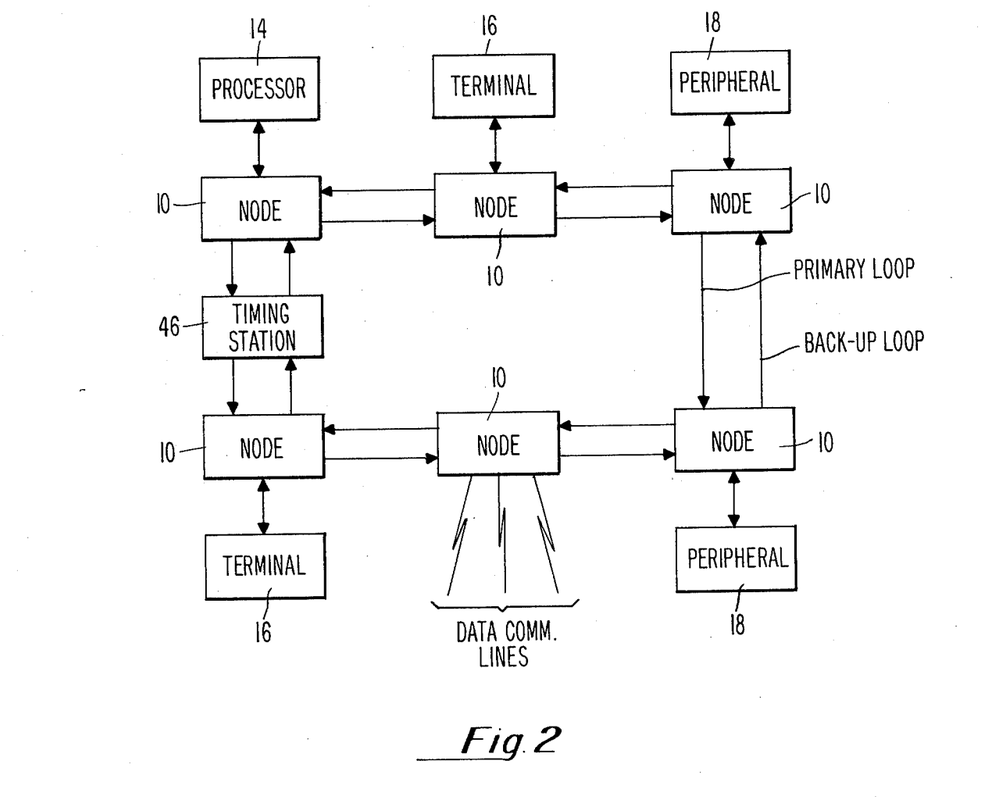
FIG. 2 illustrates the inter-connection of a plurality of nodes in a communications loop.

A functional block diagram of a communication loop node 10 is shown in FIG. 1. The node 10 provides the capability for interfacing external devices 12 (such as a processor 14, terminals 16 or peripherals 18) to each other via a loop structure such as that shown in FIG. 2. Thus, the node 10 interfaces with the external device 12 on one side and with adjacent nodes 10 on the other side. In this stand-alone form, the nodes 10 are entirely physically independent of the devices 12 that they interconnect. That is, the nodes 10 are contained in their own cabinet, supported by their own power supply and interconnected with their respective devices 12 via a standard interface. Hence, there is no modification to, or dependency upon, the interconnected devices 12. Those skilled in the art will realize that nodes 10 which are an integral part of the interconnected devices 12 may also be implemented.

In the preferred embodiment of the present invention, each node 10 is a separate, physical, self-supporting unit. Referring again to FIG. 1, each node 10 contains its own separate cabinet, power supply and clock circuitry 20. The individual nodes 10 can then be physically separated from each other by hundreds of feet and may be colocated with the devices 12 that they interconnect. Those skilled in the art will realize that in alternate embodiments a group of nodes 10 may share a common enclosure, backplane, power supply, clock circuitry and monitor. In such a configuration, the nodes 10 are colocated, but may be separated from their associated devices 12 by distances ranging from feet to miles, depending upon the specific interface characteristics.

As shown in FIG. 1, the stand-alone node includes a microprocessor 22 which is the central or controlling element of the node 10. Typical microcomputers that may be employed as the microprocessor 22 include the Burroughs Mini-D microprocessor and the Burroughs Basic Data System (BDS) microprocessor (which is used as the engine for the Burroughs B80 microcomputer system).

The memory element 24 is used to store the various program modules as well as the system tables and is further used to buffer data comm packets to and from the loop. In the preferred embodiment, static memory chips are utilized to implement the memory 24. However, those skilled in the art will realize that alternate embodiments may utilize dynamic RAM, charge coupled device memory or other available memory technologies.

The Device Interface Unit 26 acts as the controller or adapter needed to interface the microprocessor 22 to the external device 12 (processor 14, terminal 16, peripheral 18, etc.). Its basic functions include buffering of data, maintaining status of buffers, and interfacing of the data and control lines. The design of such a Device Interface Unit 26 is well known to those skilled in the art.

The Loop Interface Unit (LIU) 28 functions as the I/O interface for the microprocessor 22 to the loop. In fact, a number of LIUs 28 connected together comprise a loop in themselves. Their interconnection may be accomplished via twisted wire pair cable, coaxial cable, fiber optics, etc., depending on the transfer rate and the distance between the LIUs 28. Specific functions of the LIU 28 include:

Line drivers/receivers for interfacing the cables interconnecting the LIUs 28.

Flag recognition/generation for packet synchronization on the loop.

Address recognition relative to packets transiting the loop.

Input and output buffering of packets to and from the loop.

Cyclic redundancy check (CRC) and generation.

Message removal from the loop.

Microprocessor 22 interfacing in terms of data to/from the loop as well as status regarding buffers, CRC checks, etc.

Failure detection in the form of CRC faults, signal loss, etc.

Restoral via loop back.

It is the latter two functions, namely detection of signal loss and restoration via loop-back that are handled by the system of the present invention, the design of LIUs 28 with the other above enumerated functions being well known to those skilled in the art.

Figure 3:
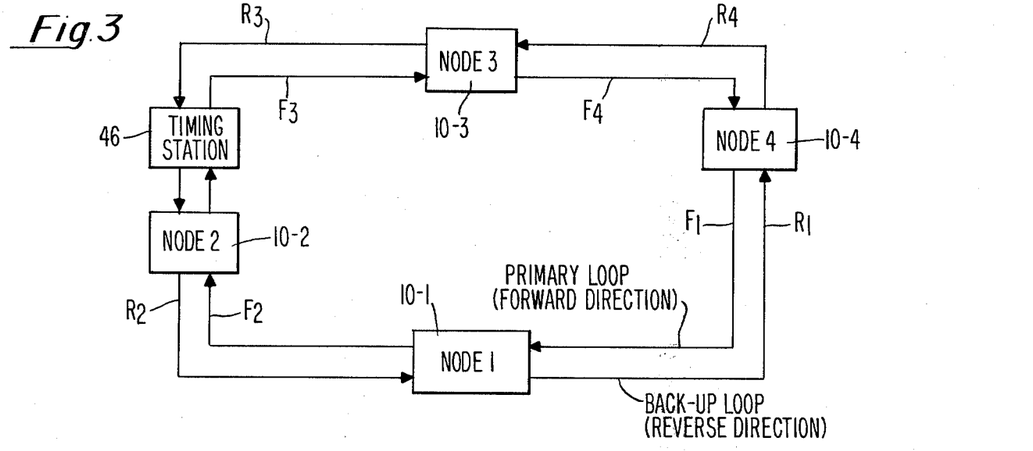
FIG. 3 shows a generalized loop configuration of nodes prior to the occurrence of any break in the loop.
Figure 4:
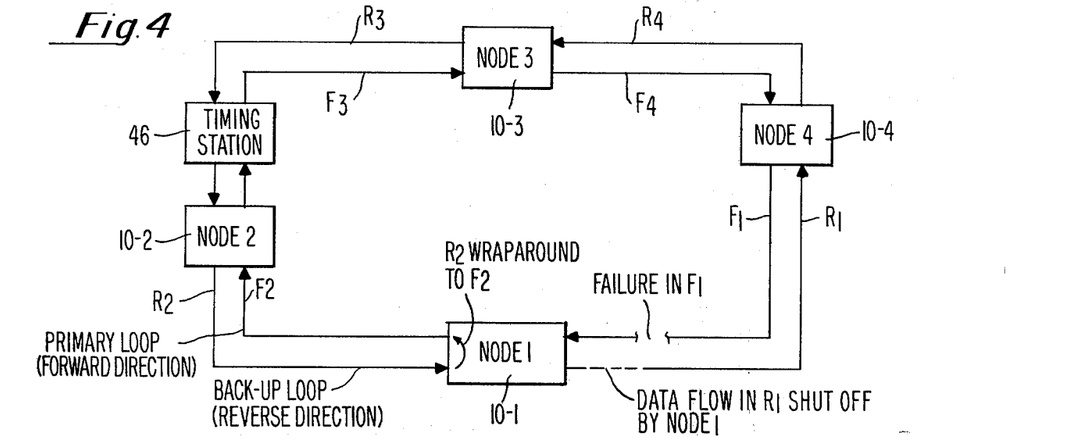
FIG. 4 is similar to FIG. 3 except that a failure has occured in the primary line and partial loop-back error recovery has been completed.
Figure 5:
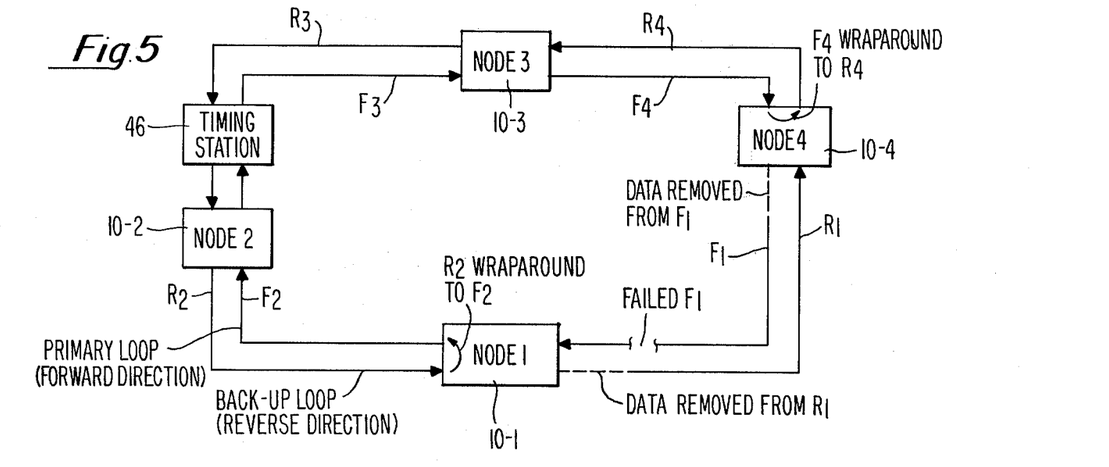
FIG. 5 is similar to FIG. 4 except that loop-back error recovery has been completed.

FIGS. 3–5 present a general overview of the technique utilized in the present invention to accomplish error recovery via loop-back. Referring to FIG. 3, all nodes 10-1, 2, 3, 4 are functionally interconnected via a single serial unidirectional communications loop. Single loops are inherently vulnerable to isolated failures. The failure of a single node 10-1, 2, 3 or 4 or link between two of nodes 10-1, 2, 3 and 4 makes the entire network inoperative. In order to avoid this catastrophic failure induced by the failure of a single component, in the preferred embodiment of the present invention a double loop configuration is employed. Thus, electrically and physically the communications loops consists of two concentric loops carrying data in opposite directions and intersecting at each node 10-1, 2, 3, 4. The double loop implementation provides the redundancy necessary to achieve uninterrupted service in the face of a break in one or both conductors, or even in the event of a node 10-1, 2, 3 or 4 failure.

One of the two loops is the primary information loop, while the second is the back-up loop, carrying only idle clocking until it is needed. In normal operation, data is carried only in one direction (forward direction); the opposite (reverse) direction links carry null (idle) data and each node 10-1, 2, 3, and 4 acts as a simple repeater in the reverse direction. A node 10-1, 2, 3, 4 reads and writes data only from or to the forward direction links, respectively.

The data stream carried on the loop is coded in a self-clocking format so that there is a guaranteed transition at each bit time. Clock generation for both the primary and back-up loops is provided by timing station 46, which may be a node 10 further including the required timing generator(s). The design of such timing generators is well known to those skilled in the art. Thus if a link between two nodes 10-1, 2, 3, 4 were to fail, the node 10-1, 2, 3, 4 receiving data from that link could detect the absence of a transition and could interpret that as a link failure. The node 10-1,2,3,4 would then institute a recovery procedure by shutting off the data returning toward the failed link and wrapping its reverse direction link onto the forward direction on the side of the node 10-1, 2, 3, 4 opposite the failure. This is illustrated in FIG. 4, assuming that a forward link $F_1$ has failed. Thus, node 10-1 detects the absence of a transition on $F_1$, and interprets it as an $F_1$ link failure. Hence node 10-1 shuts off the data flow returning to link $R_1$ and wraps its reverse direction link $R_2$ to its forward direction link $F_2$. Referring to FIG. 5, now link $R_1$ carries no data and hence node 10-4 detects a missing transition on link $R_1$ and institutes its own recovery by removing outgoing data from link $F_1$ and wrapping link $F_4$ onto link $R_4$. At this point, there is again a complete loop connecting nodes 10-1, 2, 3 and 4 together, although it is now twice as long as before the failure in link $F_1$ occurred.

It should be noted that even though messages are normally transmitted only on the primary loop, loop-back error recovery will occur when a break is detected in the back-up loop. This is necessary since the break in the back-up loop may have been created during recovery from a break in the primary loop; or, the original failure may have included breaks in both the primary and secondary loops. Further, the error recovery logic assumes that the back-up loop is intact when it initiates recovery from a failure in the primary loop.

Those skilled in the art will readily appreciate that the technique described above may be applied to remove a node 10-1,2,3, or 4 that has failed, or to isolate a link so that additional nodes 10 (not shown) may be added without disturbing the rest of the system, or to recover from double line breaks between a pair of nodes 10-1, 2, 3, 4.

As previously discussed, the LIU 28 functions as the I/O interface for the microprocessor 22 to the loop and a number of LIUs 28 connected together comprise a loop in themselves. The following description will detail the logic included in the preferred embodiment of the LIU 28 to implement loop-back error recovery as discussed previously.

Figure 6:
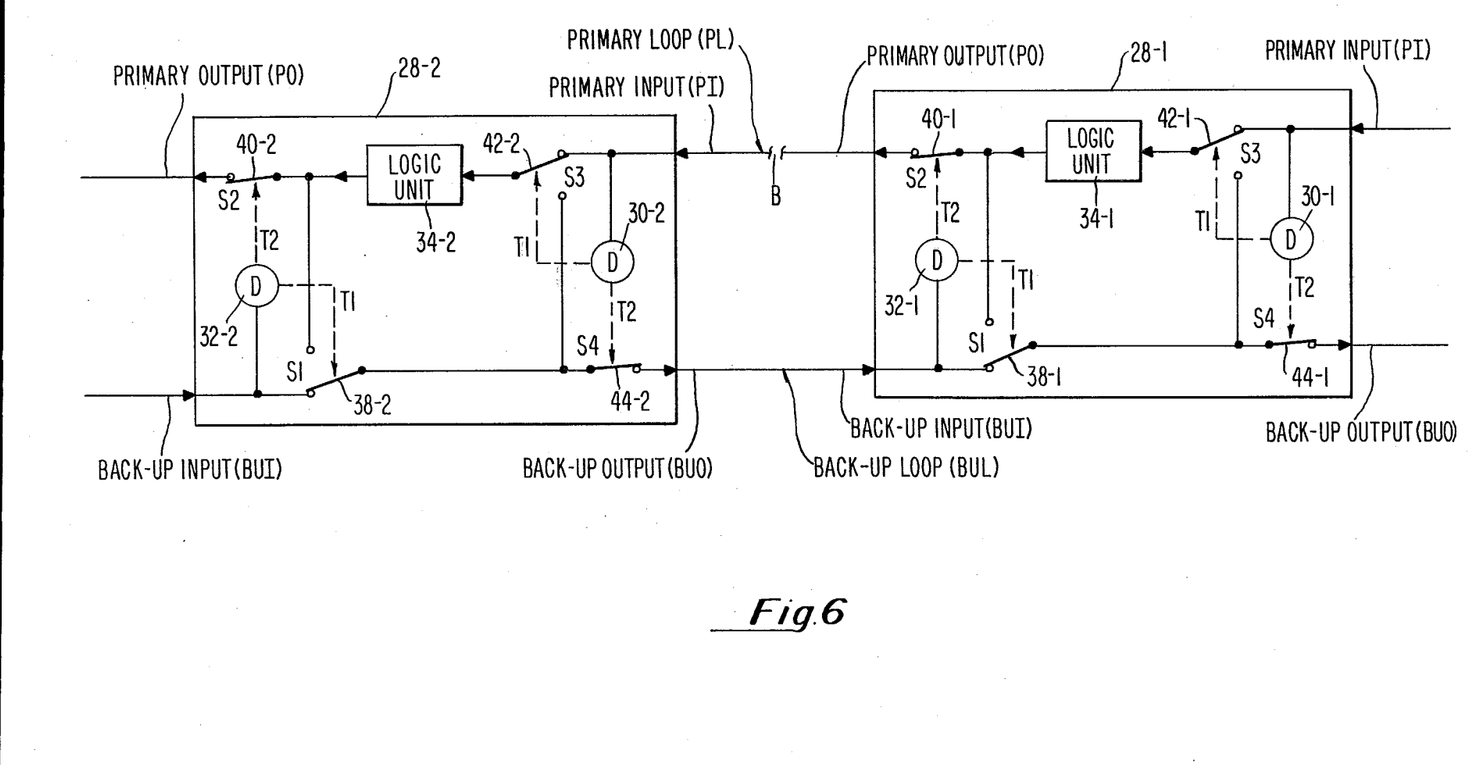
FIG. 6 shows two adjacent loop interface units at the instant a break occurs in the primary line between the two nodes.

As previously discussed, to accomplish loop-back there must actually be two counter-rotating loops. Referring to FIG. 6, which shows the preferred embodiment of the present invention, two adjacent LIUs 28-1, 2 are shown with two oppositely directed lines connecting them. Although not shown, the primary output of LIU 28-2 and the back-up output of LIU 28-1 are connected to the primary input of LIU 28-1 and the back-up input of LIU 28-2, respectively, such that there will be complete primary and back-up loops, respectively. In addition, a timing station 46 (not shown) and additional (optional) LIUs 28 (not shown) are inserted in the two oppositely directed lines. Each LIU 28-1,2 includes two clock loss detectors 30,32. Each LIU 28-1,2 further includes a main logic unit 34-1,2 to process the messages transmitted on the primary loop. The design of such a logic unit 34-1, 2 is known to those skilled in the art. The back-up loop carries only clocks and no message content in normal operation. Each LIU 28-1,2 also includes two switches S1 38-1, 2 and S2 40-1, 2 controlled by detectors 32-1,2, respectively, and two additional switches S3 42-1,2 and S4 44-1,2 controlled by detectors 30-1, 2, respectively. For ease of understanding, the switches S1-S2 and S3-S4 are shown as discrete electrical components. However, in the preferred embodiment the switches S1-S2 and S3-S4 are electronic. FIG. 6 shows the switches 38-44 in their normal positions; viz., no error recovery in progress. With the switches in the normal position, as shown, messages on the primary loop enter each LIU 28-1,2 at the primary input, are fed to the logic unit 34-1, 2 and exit each LIU 28-1, 2 from the primary output, while data on the back-up loop is routed directly from the back-up input to the back-up output. Each LIU 28-1,2 may further include drivers and receivers necessary for transmitting and receiving signals to/from the loop, respectively.

Figure 7:
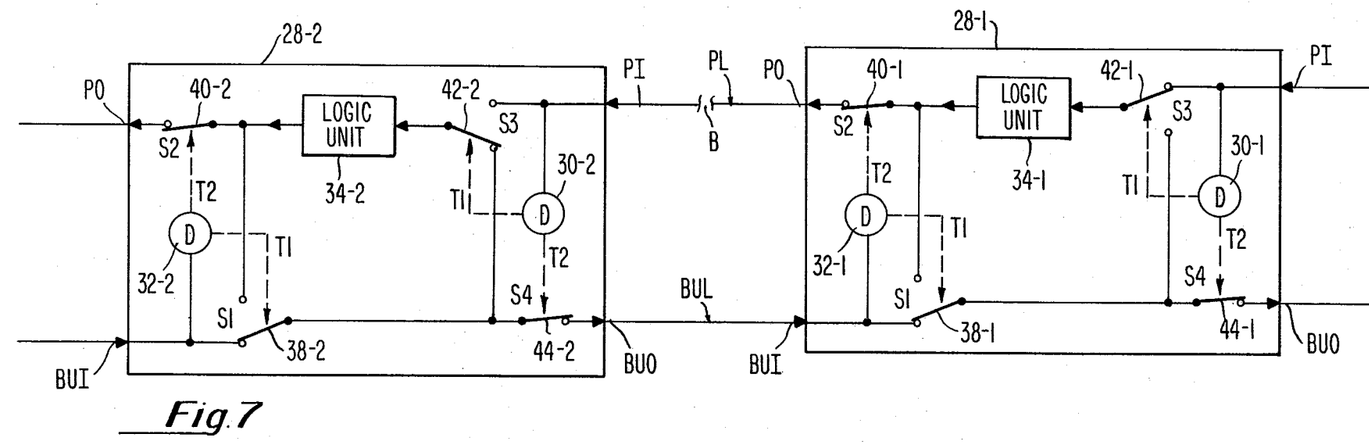
FIG. 7 is similar to FIG. 6 except that the first step in loop-back error recovery has been completed.
Figure 8:
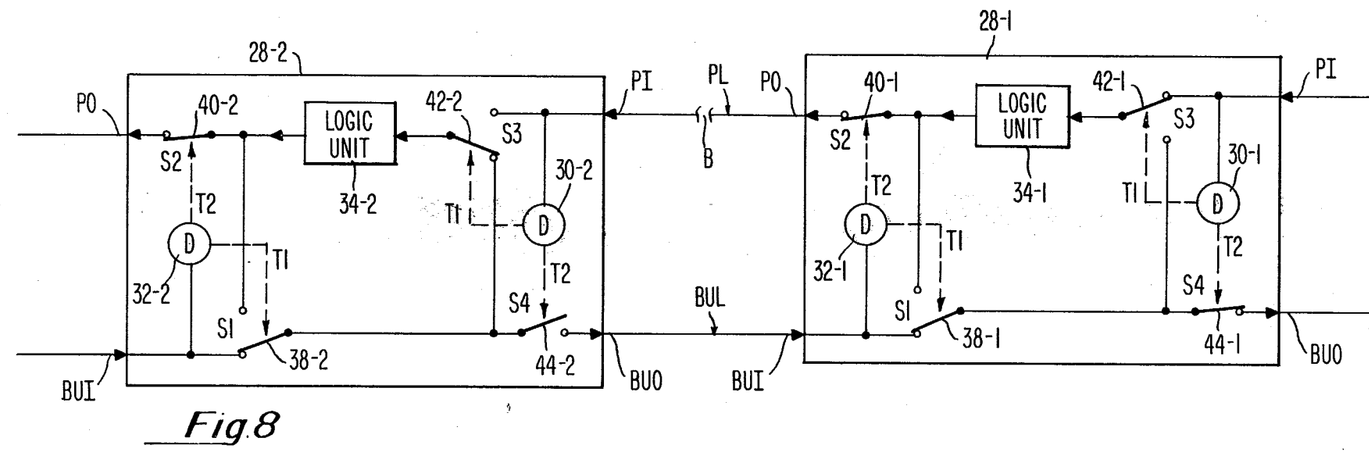
FIG. 8 is similar to FIG. 7 except that the second step in loop-back error recovery has been completed.

Clock loss detectors 30,32 are connected to the primary and back-up inputs of each LIU 28, respectively. The clock loss detectors 30,32 are responsive to a single missing transition on their respective primary and back-up loops. Referring now to clock loss detector 30-2, upon detection of a single missing transition on the primary input to LIU 28-2, detector 30-2 will start an internal timer T1. When a time period $T_1$ has elapsed, timer T1 will activate switch S3 42-2 causing it to switch from its normally open position as shown in FIG. 6 to the closed position as shown in FIG. 7. Time $T_1$ represents the maximum duration a no signal condition will be tolerated. Thus, if a signal on the primary input of LIU 28-2 is detected before time period $T_1$ has elapsed, timer T1 will be reset and turned off. In addition, at any time a clock signal is again detected by detector 30-2, timer T1 will be reset and turned off and switch S3 42-2 will be restored to its normally open position (FIG. 6) if it had previously been switched to the closed position (FIG. 7). At the same time detector 30-2 starts timer T1, it will also start internal timer T2 which measures a time period $T_2$ where $T_2$ is greater than $T_1$. When a timer period $T_2$ has elapsed (since loss of signal was detected), timer T2 will activate switch S4 44-2 causing it to switch from its normally closed position as shown in FIG. 6 to the open position as shown in FIG. 8. The delay between the actions of timers T1 and T2 is to compensate for the uncertainty as to the time of operation of detectors 30 in other LIUs 28. This will be further explained, infra. If detector 30-2 detects a signal before time period $T_2$ has elapsed, timers T1 and T2 will be reset and turned off. In addition, at any time a clock signal is again detected by detector 30-2, timers T1 and T2 will be reset and turned off and switches S3 42-2 and S-4 44-2 will be restored to their normal positions (FIG. 6).

Operation of detector 32 in each LIU 28 is analogous to that of detector 30, except that detector 32 is responsive to signals on the back-up input to the LIU 28. Thus detector 32's T1 and T2 timers measure approximately the same time periods $T_1$ and $T_2$ as detector 30's T1 and T2 timers, respectively, except that detector 32's T1 and T2 timers are activated by detector 32 sensing a loss of back-up input signal.

For purposes of explaining the operation of the loopback circuitry, it will be assumed that a physical break has occurred at point B in the primary loop between LIUs 28-1 and 28-2 (FIG. 6). FIG. 6 shows both LIUs 28-1, 2 in their normal states at the instant the break occurs.

After the break occurs, detector 30-2 detects the loss of signal at the primary input of LIU 28-2 and starts its T1 and T2 timers. After the time period $T_1$ has elapsed, detector 30-2 causes switch S3 42-2 to reverse its setting (FIG. 7). This causes the back-up output of LIU 28-2 to be routed onto the primary input of logic unit 34-2, thus effectively causing a wraparound of the back-up path onto the primary path. At this time LIU 28-1 still has its switches 38-1 through 44-1 in their normal settings and hence the loop is still disrupted.

Figure 9:
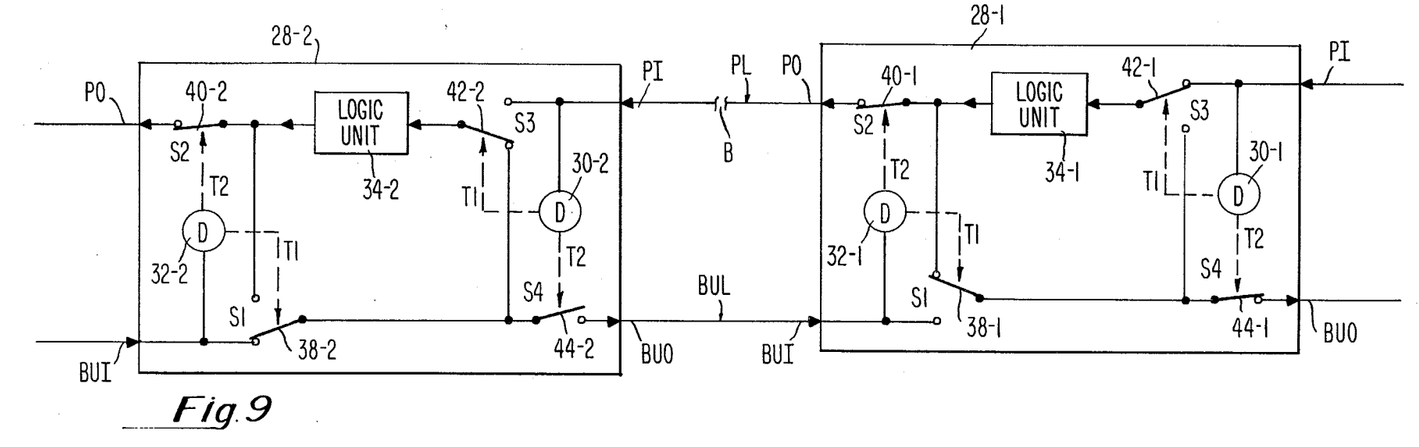
FIG. 9 is similar to FIG. 8 except that the break in the primary line has been healed by making use of a back-up path to route signals around the broken link.

After a time $T_2$ has passed since the break was detected by detector 30-2, where $T_2$ is greater than $T_1$, switch S4 44-2 is opened by detector 30-2 (FIG. 8). This interrupts the flow of signals from the back-up output of LIU 28-2 and thus causes a loss of signal at the back-up input of LIU 28-1. Detector 32-1 senses the loss of the back-up input signal to LIU 28-1 and starts its timers T1 and T2. After the time period $T_1$ has elapsed, detector 32-1 causes switch S1 38-1 to reverse its setting (FIG. 9). This results in the primary output of logic unit 34-1 being routed onto the back-up input of LIU 28-1 at a point past detector 32-1, thus effectively causing a wraparound of the primary path onto the back-up path.

Figure 10:
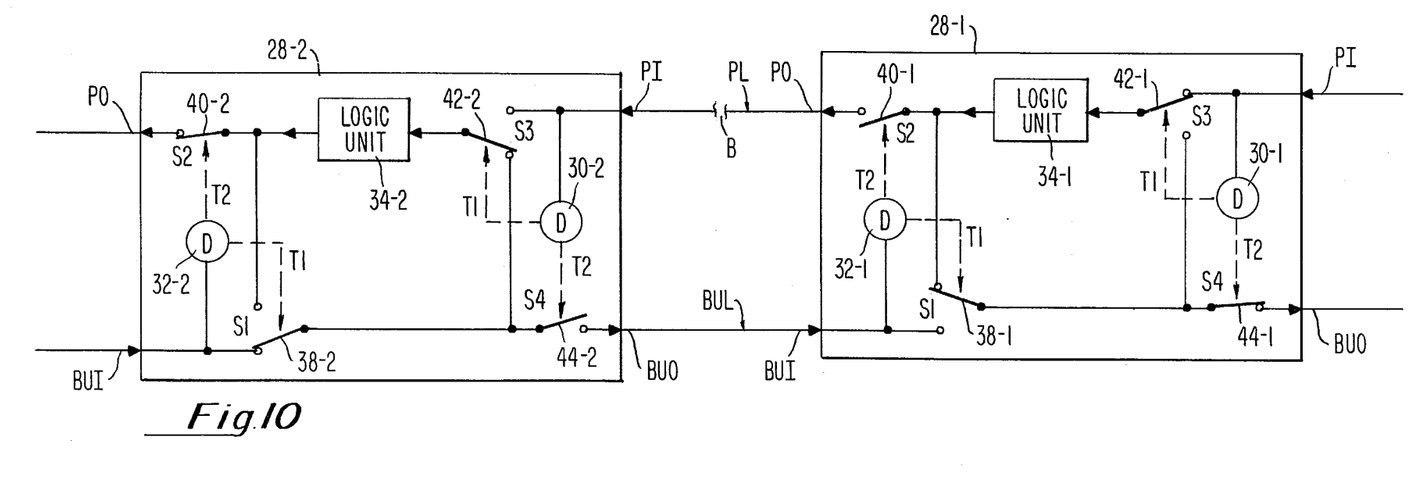
FIG. 10 is similar to FIG. 9 except that full error recovery has been completed.

At this point the break in the primary loop has been healed by making use of the back-up path to route signals around the broken link. Thus, there is again a complete loop connecting nodes 28-1 and 2 together, although it is now twice as long as before the break at point B occurred. As shown in FIG. 10, one final action occurs. After a time $T_2$ has passed since the loss of back-up input signal was detected by detector 32-1, where $T_2$ is greater than $T_1$, switch S2 40-1 is opened by detector 32-1. This action has no effect on the operation of the loop, but is merely the completion of recovery.

Figure 11:
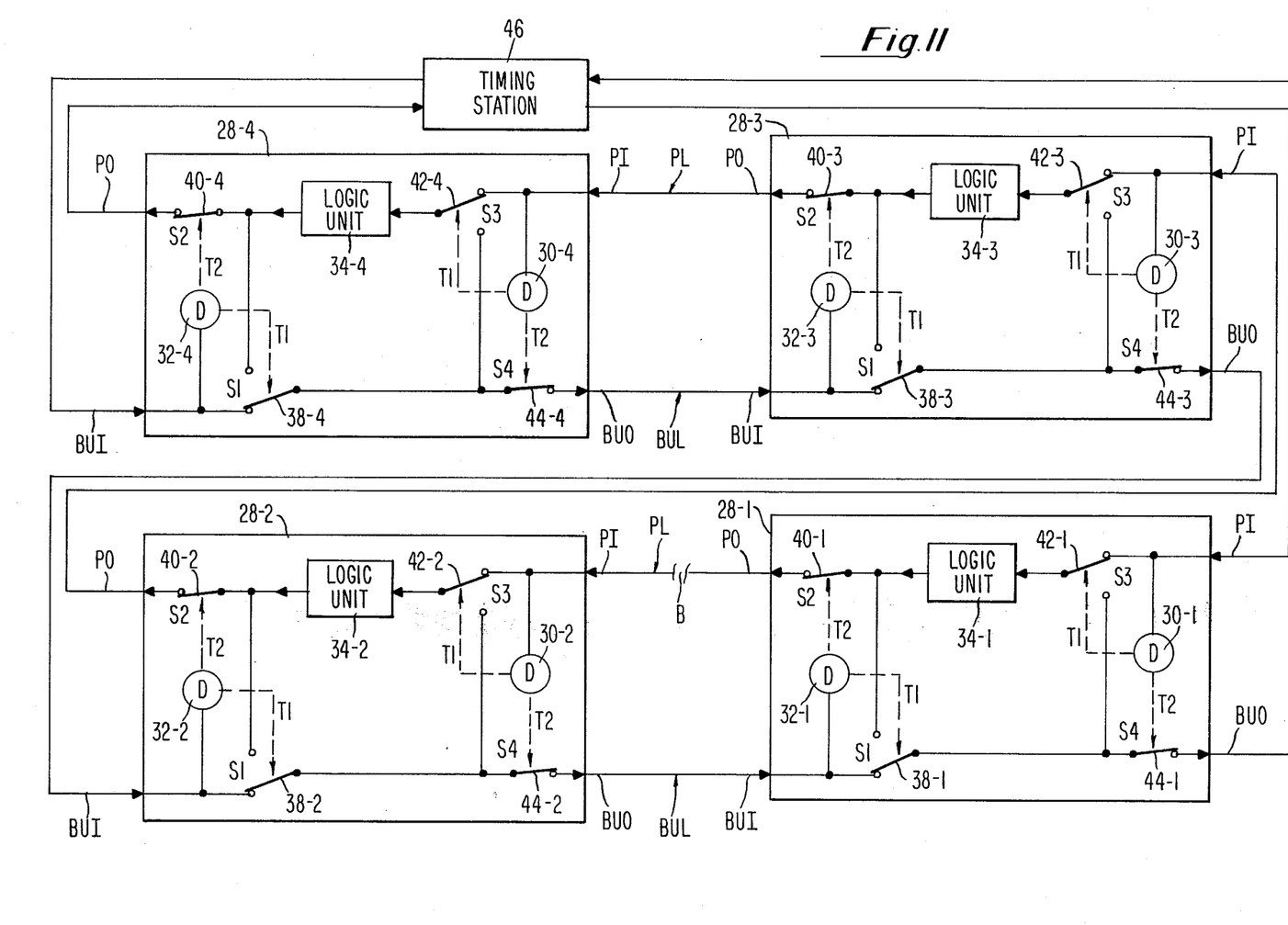
FIG. 11 shows four adjacent loop interface units connected in a loop configuration.

As discussed previously, $T_1$ represents the maximum time a no signal condition will be tolerated by any LIU 28. Time $T_2$ is greater than time $T_1$ in order to assure that any LIU 28 incorrectly initiating error recovery will be reset before error recovery by the LIU 28 adjacent to the failing link is completed. Referring now to FIG. 11, assume that a break occurs at point B in the primary loop between LIUs 28-1 and 28-2. The break initially causes a loss of signal at the primary inputs of each of the three LIUs 28-2, 3, 4. A signal loss will not be detected at the primary input to LIU 28-1 since the primary input of LIU 28-1 is receiving timing signals from the primary output of timing station 46. In the preferred embodiment, timing station 46 may be similar to other LIUs 28, except that it further includes timing generator(s) to produce the required timing signals on the primary and back-up loops. Due to slight variations in the detectors 30-2, 3, 4, the loss of primary input signal may be detected by detector 30-3 or 4 before it is detected by detector 30-2; or time period $T_1$ may be slightly shorter for detector 30-3 or 4 than it is for detector 30-2; or time period $T_1$ for detector 30-3 or 4 may expire just after it expires for detector 30-2. In either of the latter three cases, one or more of detectors 30-3 or 4 may be implementing wraparound before or slightly after detector 30-2 begins wraparound.

Assume that detector 30-3 detects the loss of primary input signal first, followed by detector 30-4 and finally followed by detector 30-2. Again assuming that time $T_1$ passes for detector 30-3 first, detector 30-3 will change the position of switch 42-3 such that the back-up output of LIU 28-3 will be routed to the input to logic unit 34-3. This will cause a signal to be present at the primary input to LIU 28-4 and will reset detector 30-4 which in turn will restore switch 42-4 to its normal position (if it had already switched). The signal on the primary input to LIU 28-4 will then be propagated to the primary input of LIU 28-1. At this point, detector 30-2 has not been reset since the break in the primary loop blocks the primary output of LIU 28-1 from reaching the primary input to LIU 28-2.

When time period $T_1$ for detector 30-2 passes, detector 30-2 will change the position of switch 42-2 such that the back-up output of LIU 28-2 is wrapped around onto the input of logic unit 34-2. This will cause a signal to be routed from the primary output of LIU 28-2 to the primary input of LIU 28-3. The input signal will be sensed by detector 30-3 which will reset switch 42-3 to its normal position. Thus, loop-back error recovery for LIUs 28-3 and 4 will have been cancelled and all incorrect loop-backs will have been eliminated. This assures that the system is not locked into a shorter loop around the break than the system is capable of implementing based on the failure in a single link. At this time the only LIU 28 with an active loop-back of back-up onto primary is LIU 28-2, which is immediately downline from the failure at point B in the primary loop. Thus, $T_2$ is chosen to be greater than any possible $T_1$ in order to assure that all incorrect loop-backs of the back-up loop to the primary loop are eliminated. At time $T_2$, switch 44-2 is opened by detector 30-2, thus creating a failure in the back-up loop between LIUs 28-2 and 1 and instituting loop-back recovery analogous to that described for the actual break.

Having shown and described the preferred embodiment of the present invention, those skilled in the art will realize that various omissions, substitutions and changes in forms and details of the present invention may be made without departing from the spirit of the invention. Thus, it will be obvious to those skilled in the art that the microprocessor 22 additionally may be utilized to control the detectors 30,32 in the connected LIU 28 (FIG. 1). In such case, a node 10 experiencing excessive intermittent failures or a noisy line connecting two nodes 10 may be bypassed programatically under control of the microprocessor 22 software; or, the lines between two nodes 10 may be bypassed programatically while an additional node 10 is connected to the loop. It is the intention, therefore, to be limited only as indicated by the scope of the following claims.

What is claimed is:

1. A self-healing loop communications system comprising:

a primary closed loop unidirectional transmission line for transmitting signals in a first direction;

a back-up closed loop unidirectional transmission line for transmitting signals in a second direction opposite to said first direction;

first means coupled to said primary and back-up lines for providing on one of said primary and back-up lines a serial data stream in a self-clocking code and further for providing on said other of said primary and back-up lines a stream of self-clocking idle data; and a plurality of loop interface units coupled to said primary and back-up lines, each of said loop interface units including second means connected to said one of said primary and back-up lines for detecting a first fault in said one of said primary and back-up lines, third means connected to said other of said primary and back-up lines and said second means and responsive to said second means for switching between a first state wherein that one of said loop interface units is coupled to said other of said primary and back-up lines and a second state wherein that one of said loop interface units is uncoupled from said other of said primary and back-up lines, and fourth means connected to said one of said primary and back-up lines and said second and third means and responsive to said second means for switching between a third state wherein that one of said loop interface units is coupled to said one of said primary and back-up lines and a fourth state wherein that one of said loop interface units is uncoupled from said one of said primary and back-up lines and said primary and back-up lines are interconnected and transferring said signals on said back-up and primary lines to the other of said back-up and primary lines, said primary and back-up lines thereby cooperating to provide a first new closed loop unidirectional transmission line to bypass said first fault.

2. The self-healing loop communications system in accordance with claim 1 wherein said second means includes:

fifth means for detecting the presence or absence of one of said signals on said one of said primary and back-up lines;

sixth means connected to said fourth and fifth means and responsive to the absence of a detected signal on said one of said primary and back-up lines for a first time period for switching said fourth means to the fourth state; and seventh means connected to said third and fifth means and resposive to the absence of a detected signal on said one of said primary and back-up lines for a second time period for switching said third means to said second state.

3. The self-healing loop communications system in accordance with claim 2 wherein:

said sixth means further includes means responsive to the detection of one of said signals on said one of said primary and back-up lines for switching said fourth means from the fourth state to the third state; and said seventh means further includes means responsive to the detection of one of said signals on said one of said primary and back-up lines for switching said third means from the second state to the first state.

4. The self-healing loop communications system in accordance with claim 3 wherein said second time period is at least equal to said first time period.

5. The self-healing loop communications system in accordance with claim 1 or 3 wherein each of said loop interface units further includes:

eighth means connected to said other of said primary and back-up lines for detecting a second fault in said other of said primary and back-up lines;

ninth means connected to said one of said primary and back-up lines and said eighth means and responsive to said eighth means for switching between a fifth state wherein that one of said loop interface units is coupled to said one of said primary and back-up lines and a sixth state wherein that one of said loop interface units is uncoupled from said one of said primary and back-up lines; and tenth means connected to said other of said primary and back-up lines and said eighth and ninth means and responsive to said eighth means for switching between a seventh state wherein that one of said loop interface units is coupled to said other of said primary and back-up lines and an eighth state wherein that one of said loop interface units is uncoupled from said other of said primary and back-up lines and said primary and back-up lines are interconnected and transferring said signals on said back-up and primary lines to the other of said back-up and primary lines, said primary and back-up lines thereby cooperating to provide a second new closed loop unidirectional transmission line to bypass said second fault.

6. The self-healing loop communications system in accordance with claim 5 wherein said eighth means includes:

eleventh means for detecting the presence or absence of one of said signals on said other of said primary and back-up lines;

twelfth means connected to said tenth and eleventh means and responsive to the absence of a detected signal on said other of said primary and back-up lines for a third time period for switching said tenth means to the eighth state; and thirteenth means connected to said ninth and eleventh means and responsive to the absence of a detected signal on said other of said primary and back-up lines for a fourth time period for switching said ninth means to said sixth state.

7. The self-healing loop communications system in accordance with claim 6 wherein:

said twelfth means further includes means responsive to the detection of one of said signals on said other of said primary and back-up lines for switching said tenth means from the eighth state to the seventh state; and said thirteenth means further includes means responsive to the detection of one of said signals on said other of said primary and back-up lines for switching said ninth means from the sixth state to the fifth state.

8. The self-healing loop communications system in accordance with claim 7 wherein said fourth time period is at least equal to said third time period.

9. The self-healing loop communications system in accordance with claim 8 wherein said first time period is equal to said third time period and said second time period is equal to said fourth time period.

10. The self-healing loop communications system in accordance with claim 5 further including means for connecting said third and said tenth means wherein signals on said other of said primary and back-up lines are routed directly through that one of said loop interface units when said third and said tenth means are in the first and the seventh states respectively.

11. The self-healing loop communications system in accordance with claim 10 further including means for connecting said fourth and said ninth means wherein signals on said one of said primary and secondary lines are routed directly through that one of said loop interface units when said fourth and said ninth means are in the third and the fifth states respectively.

12. The self-healing loop communications system in accordance with claim 10 further including logic means connected between said fourth and said ninth means, said logic means for interfacing an external device with said self-healing loop communications system.

13. A self-healing loop communications system for interfacing a plurality of external devices to each other in a loop structure, comprising:

a primary closed loop unidirectional transmission line for transmitting signals in a first direction;

a back-up closed loop unidirectional transmission line for transmitting signals in a second direction opposite to said first direction;

first means coupled to said primary and back-up lines for providing on one of said primary and back-up lines a serial data stream in a self-clocking code and further for providing on said other of said primary and back-up lines a stream of self-clocking idle data; and a plurality of nodes coupled to said primary and back-up lines, each of said nodes including loop interface means for transferring digital information to and from said primary and back-up lines, processor means connected to said loop interface means for processing said digital information and further for controlling said loop interface means, memory means connected to said processor means for storing programs and data for use by said processor means, and device interface means connected to said processor means and one of said external devices for interfacing said processor means with said external device.

14. The self-healing loop communications system in accordance with claim 13 wherein said loop interface means includes:

second means connected to said one of said primary and back-up lines for detecting a first fault in said one of said primary and back-up lines;

third means connected to said other of said primary and back-up lines and said second means and responsive to said second means for switching between a first state wherein said loop interface means is coupled to said other of said primary and back-up lines and a second state wherein said loop interface means is uncoupled from said other of said primary and back-up lines; and fourth means connected to said one of said primary and back-up lines and said second and third means and responsive to said second means for switching between a third state wherein said loop interface means is coupled to said one of said primary and back-up lines and a fourth state wherein said loop interface means is uncoupled from said one of said primary and back-up lines and said primary and back-up lines are interconnected and transferring said signals on said back-up and primary lines to the other of said back-up and primary lines, said primary and back-up lines thereby cooperating to provide a first new closed loop unidirectional transmission line to bypass said first fault.

15. The self-healing loop communications system in accordance with claim 14 wherein said second means includes;

fifth means for detecting the presence or absence of one of said signals on said one of said primary and back-up lines;

sixth means connected to said fourth and fifth means and responsive to the absence of a detected signal on said one of said primary and back-up lines for a first time period for switching said fourth means to the fourth state; and seventh means connected to said third and fifth means and responsive to the absence of a detected signal on said one of said primary and back-up lines for a second time period for switching said third means to said second state.

16. The self-healing loop communications system in accordance with claim 15 wherein:

said sixth means further includes means responsive to the detection of one of said signals on said one of said primary and back-up lines for switching said fourth means from the fourth state to the third state; and said seventh means further includes means responsive to the detection of one of said signals on said one of said primary and back-up lines for switching said third means from the second state to the first state.

17. The self-healing loop communications system in accordance with claim 16 wherein said second time period is at least equal to said first time period.

18. The self-healing loop communications system in accordance with claims 14 or 16 wherein each of said loop interface means further includes:

eighth means connected to said other of said primary and back-up lines for detecting a second fault in said other of said primary and back-up lines;

ninth means connected to said one of said primary and back-up lines and said eighth means and responsive to said eighth means for switching between a fifth state wherein said loop interface means is coupled to said one of said primary and back-up lines and a sixth state wherein said loop interface means is uncoupled from said one of said primary and back-up lines; and tenth means connected to said other of said primary and back-up lines and said eighth and ninth means and responsive to said eighth means for switching between a seventh state wherein said loop interface means is coupled to said other of said primary and back-up lines and an eighth state wherein said loop interface means is uncoupled from said other of said primary and back-up lines and said primary and back-up lines are interconnected and transferring said signals on said back-up and primary lines to the other of said back-up and primary lines, said primary and back-up lines thereby cooperating to provide a second new closed loop unidirectional transmission line to bypass said second fault.

19. The self-healing loop communications system in accordance with claim 18 wherein said eighth means includes:

eleventh means for detecting the presence or absence of one said signals on said other of said primary and back-up lines;

twelfth means connected to said tenth and eleventh means and responsive to the absence of a detected signal on said other of said primary and back-up lines for a third time period for switching said tenth means to the eighth state; and thirteenth means connected to said ninth and eleventh means and responsive to the absence of a detected signal on said other of said primary and back-up lines for a fourth time period for switching said ninth means to said sixth state.

20. The self-healing loop communications system in accordance with claim 19 wherein:

said twelfth means further includes means responsive to the detection of one of said signals on said other of said primary and back-up lines for switching said tenth means from the eighth state to the seventh state; and said thirteenth means further includes means responsive to the detection of one of said signals on said other of said primary and back-up lines for switching said ninth means from the sixth state to the fifth state.

21. The self-healing loop communications system in accordance with claim 20 wherein said fourth time period is at least equal to said third time period.

22. The self-healing loop communications system in accordance with claim 21 wherein said first time period is equal to said third time period and said second time period is equal to said fourth time period.

23. The self-healing loop communications system in accordance with claim 18 further including means for connecting said third and said tenth means wherein signals on said other of said primary and said back-up lines are routed directly through said loop interface means when said third and said tenth means are in the first and the seventh states respectively.

24. The self-healing loop communications system in accordance with claim 23 further including logic means connected between said fourth and said ninth means, said logic means for interfacing said loop interface means with said processor means.

* * * * *